US009148427B2

(12) United States Patent
Lamberton et al.

(10) Patent No.: US 9,148,427 B2
(45) Date of Patent: Sep. 29, 2015

(54) SYSTEM AND METHOD FOR IMPLEMENTING A ROBOT PROOF WEB SITE

(75) Inventors: Marc Lamberton, Antibes (FR); Eric Levy-Abegnoli, Nice (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 2019 days.

(21) Appl. No.: 12/113,607

(22) Filed: May 1, 2008

(65) Prior Publication Data

US 2008/0209217 A1    Aug. 28, 2008

Related U.S. Application Data

(63) Continuation of application No. 09/901,442, filed on Jul. 9, 2001, now Pat. No. 7,373,510.

(30) Foreign Application Priority Data

Sep. 12, 2000    (EP) .................................... 00480085

(51) Int. Cl.
G06F 7/04         (2006.01)
H04L 29/06     (2006.01)
G06F 17/30     (2006.01)

(52) U.S. Cl.
CPC ............ *H04L 63/10* (2013.01); *G06F 17/3089* (2013.01)

(58) Field of Classification Search
None
See application file for complete search history.

(56) References Cited

U.S. PATENT DOCUMENTS

| 5,559,961 | A  | * | 9/1996  | Blonder ......................... 726/18 |
| 5,855,020 | A  | * | 12/1998 | Kirsch ................................. 1/1 |
| 6,195,698 | B1 | * | 2/2001  | Lillibridge et al. ........... 709/225 |
| 6,199,065 | B1 | * | 3/2001  | Kenyon ............................... 1/1 |
| 6,209,104 | B1 | * | 3/2001  | Jalili ............................... 726/18 |
| 7,051,369 | B1 | * | 5/2006  | Baba ............................... 726/23 |

FOREIGN PATENT DOCUMENTS

| JP | 11-298481   | 10/1999 |
| KR | 2000-54521  | 9/2000  |

OTHER PUBLICATIONS

Ahn et al. "Telling Humans and Computers Apart (Automatically) or How Lazy Cryptographers do AI"; Communications of the ACM, 2004.*
The CaptchaProject: Gimpy web page; downloaded from archive.org on Aug. 19, 2010: http://web.archive.org/web20010524235558/www.captcha.net/gimpy.html8/19/2010.*

(Continued)

*Primary Examiner* — Kaveh Abrishamkar
(74) *Attorney, Agent, or Firm* — Steven M. Greenberg, Esq.; CRGO Law

(57) ABSTRACT

The invention prevents robots from browsing a Web site beyond a welcome page. When an initial request from an undefined originator is received, the Web site responds to it with a welcome page including a challenge. Then, on receiving a further request from the undefined originator, the Web site can check whether the challenge is fulfilled or not. If fulfilled, the undefined originator is assumed to be a human being and authorized to go on. If the challenge is not fulfilled, the undefined originator is assumed to be a robot, in which case site access is further denied.
The invention prevents Web site contents from being investigated by robots while not requiring users to have to log on.

20 Claims, 4 Drawing Sheets

To Enter this Site a Key is not Necessary, Money will not Let you IN, Waiting will not Help, All you Really Need is Luck !

[530]

(56) References Cited

OTHER PUBLICATIONS

Coates et al. "Pessimal Print: A Reverse Turing Test"; Proceedings, IAPR 6th Int'l Conf. on Document Analysis and Recognition, Seattle, WA, Sep. 10-13, 2001, pp. 1154-1158.*

D.R. Hobaugh "A Practical Turing Test for Detecting Adbots" Intelligence, vol. 12, Issue 4, Winter 2001.* http://www.captcha.net/captchas/bongo/ dated Aug. 13, 2002.* http://web.archive.org/web/20020204070232/http://www.captcha.net/cgi-bin/bongo downloaded on Feb. 9, 2011.*

Yuki, H.; CGI Lessons Using C&Perl (the 18th lesson)—For Creation of Attractive Web—Daily Quiz; C Magazine, vol. 11, No. 10, Softbank Publishing, Inc.: Oct. 1, 1999, pp. 168-173.

Yuki, H.; Introduction of CGI Creation Using Perl-Application Version; first edition: Softbank Publishing, Inc.; Jul. 30, 1998, pp. 379-399.

JPI Version 6 JP11/Remote Control; Operation Manual, Hitachi Ltd., Jun. 30, 2000, Version 1, pp. 141-146.

Hiroshi Yuhki, "CGL Lession—Learning by C. S. Perl", Oct. 1, 1999.

Hiroshi Yuhki, "Introduction to CGL Created by Perl", Jul. 30, 1998.

* cited by examiner

```
<!doctype html public "-//w3c//dtd html 4.0 transitional//en">
<html><head><title>Cross</title></head>
<body text="#000000" bgcolor="#000000" link="#0000EE" vlink="#551A8B" alink="#FF0000">

<h1><i><font color="#3366FF">Welcome Page</font></i></h1></center>

<hr WIDTH="100%"><br>
<a href="/cgi-bin/challenge.exe?id=XD34F739"><img SRC="cross.gif" ismap ...
                                                      ... height=135 width=183></a>
</body>
</html>
```

Welcome Page
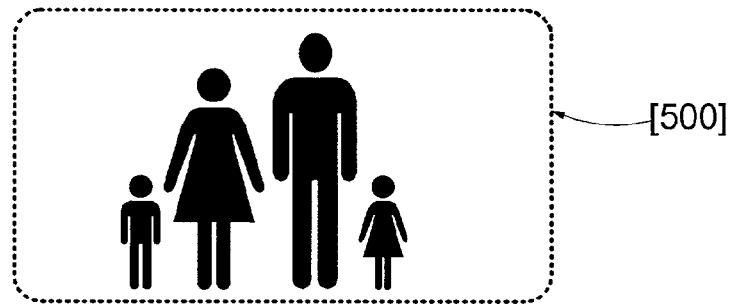
[500]
To Go Further Please, Tell us Who is the Tallest ?
[510]
Figure 5-a
Welcome Page
[520]
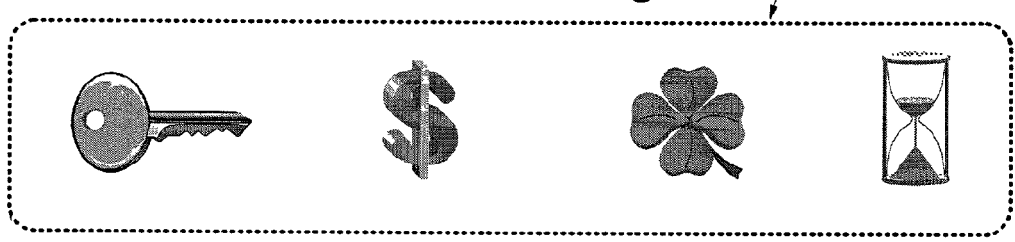
To Enter this Site a Key is not Necessary, Money will not Let you IN, Waiting will not Help, All you Really Need is Luck !
[530]
Figure 5-b

SYSTEM AND METHOD FOR IMPLEMENTING A ROBOT PROOF WEB SITE

CROSS-REFERENCE TO RELATED APPLICATIONS

This application is a Continuation of U.S. application Ser. No. 09/901,442, filed on Jul. 9, 2001, now U.S. Pat. No. 7,373,510, which also claim priority to European Patent Application 00480085.0, filed Sep. 12, 2000, which are incorporated herein by reference in its entirety.

FIELD OF THE INVENTION

The present invention relates to the Internet and more particularly applies to those of the World Wide Web (WWW) sites that, while welcoming human beings, want to exclude robots from visiting and gathering information from them.

BACKGROUND OF THE INVENTION

WWW robots, also called Web Wanderers, Web Crawlers or Web Spiders, and often just referred to as bots (bot is short for robot), are programs devised to automatically traverse the hypertext structure of the Web. Such bots, having retrieved a document, can also recursively retrieve all the linked pages referenced in the document. This is especially the case of numerous search engines and their robots which roam the World Wide Web finding and indexing content to add to their databases. Although most robots provide a valuable service, concern has developed amongst Web site administrators about exactly how much of their precious server time and bandwidth is being used to service requests from these engines.

While the majority of robots are well designed, are professionally operated and cause no problems, there are occasions where robots visiting Web servers are not welcome because of the way robots behave. Some may swamp servers with rapid-fire requests, or retrieve the same files repeatedly. If done intentionally this is a form of Denial of Service (DoS) attack, although this is more often just the result of a poor or defective robot design. In other situations robots traverse parts of WWW servers that are not suitable for being searched e.g., contain duplicated or temporary information, include large documents or e.g., CGI scripts (CGI is a standard for running external programs from a World-Wide Web HTTP server). In this latter case and in similar situations, when accessed and executed, scripts tend to consume significant server resources in generating dynamic pages and thus, slow down the system.

In recognition of these problems many Web robots offer facilities for Web site administrators and content providers to limit what the robot is allowed to do. Two mechanisms are provided. One is referred to as the 'Robots Exclusion Protocol', even though it is not really an enforced protocol, but was a working draft document discussed as an Internet-Draft by the Internet Engineering Task Force (IETF) in 1996 under the title 'A Method for Web Robots Control'. According to this document, a Web site administrator can indicate which parts of the site should not be visited by a robot. This is accomplished by providing a specially formatted file, in http:// . . . /robots.txt. The second mechanism assumes that a Web author can indicate whether a page may or may not be indexed, or analyzed for links, through the use of a special Hyper Text Markup Language (HTML) META tag i.e., a 'Robots META tag'. However, both of these mechanisms rely on cooperation from the robots, and are not even guaranteed to work for every robot. Moreover, as already suggested here above relative to DoS attacks, some of these robots may not be so friendly. They could be run e.g., with the malicious intent of attacking a Web site (then, they just ignore the robots.txt file and the robots meta tags) so the site becomes overloaded and starts refusing to serve legitimate users i.e., the human beings trying to make normal use of the site.

Also, although the information made available on a site may not be confidential, an administrator may want to prevent the unlimited dissemination of it that would otherwise result from the indexing and referencing activities of all sorts of robots. The standard way of achieving this is to protect a Web site through some form of authentication, of which the more common method is to manage a list of registered users having a password so as they have to sign on upon accessing the site. The obvious drawback of this is that administrators must manage and update a closed list of users. This requires a registration step for a first consultation of a site and also assumes that users will remember their passwords in subsequent consultations. This may not be at all what the administrator wanted to achieve, and may even be counterproductive, since it will certainly discourage some individuals who are willing to browse a site to go further if they are requested to register.

OBJECT OF THE INVENTION

Thus, it is a broad object of the invention to prevent Web site contents from being investigated by robots.

It is a further object of the invention to encourage human beings, attempting to access a robot protected Web site, to proceed further by not imposing a registration at first access and a log on procedure at each subsequent access.

It is still another object of the invention to avoid reliance on a robot's cooperation for barring the robot's access to contents of Web sites.

Further objects, features and advantages of the present invention will become apparent to the ones skilled in the art upon examination of the following description in reference to the accompanying drawings. It is intended that any additional advantages be incorporated herein.

SUMMARY OF THE INVENTION

A method and a system for preventing robots from browsing a Web site beyond a welcome page are described. On receiving an initial request from an undefined originator, the Web site responds to the request with a welcome page including a challenge. Then, on receiving a further request from the undefined originator, the Web site can check whether the challenge is fulfilled or not. If fulfilled, the undefined originator is assumed to be a human being and the site keeps processing the further request and all subsequent ones, if any. However, if the challenge is not fulfilled, the undefined originator is assumed to be a robot, in which case all requests from that originator are not further processed.

The invention prevents Web site contents from being investigated by robots without requiring end users to register or the site administrator to have to manage an access list of authorized users.

BRIEF DESCRIPTION OF THE DRAWINGS

FIG. 5 are other exemplary welcome pages with challenges.

DETAILED DESCRIPTION OF THE PREFERRED EMBODIMENT

Figures 1, 2:
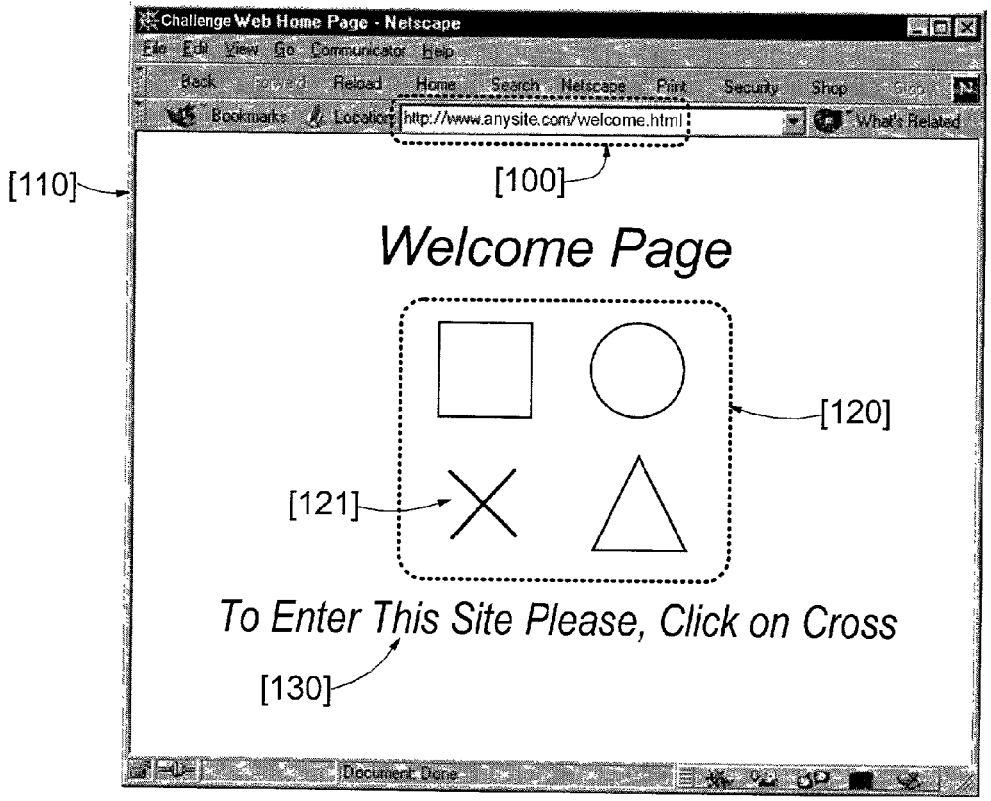
FIG. 1 is an exemplary welcome page per the invention.
FIG. 2 shows the corresponding HTML code.

FIG. 1 illustrates the method according to the invention to prohibit robots from accessing a Web site beyond its welcome page. An exemplary welcome page as seen by an individual accessing a Web site e.g., at following URL [100] (Uniform Resource Locator) 'http://www.anysite.com/welcome.html' is shown. Accessing a Web site can be done with any available Web browser e.g., Netscape browser [110] from Netscape Communications Corporation, 501 E. Middlefield Road, Mountain View, Calif. 94043, USA can be used. Then, according to a first method to prohibit robot's access, the welcome page implements a dummy challenge that can be simply answered by a human being, but which a robot should certainly fail.

Among various possibilities, FIG. 1 illustrates a typical challenge according to the invention. The welcome page thus shows an image [120] including, in this particular example, a few geometric forms that can be unambiguously referred to by a single word or expression in a language that the individual accessing the Web is assumed to be capable of reading. Then, associated with the image which, as depicted here, includes a square, a circle, a cross and a triangle, the reader is prompted [130] to click e.g., on the cross [121]. A human being, desiring to go on and visit the site, will do it naturally while a robot will do nothing, or will do it wrongly simply because it just does not understand the graphic symbols or which of them may be a cross. Hence, this invention easily allows discrimination of a human being from a robot on the basis of their respective levels of abstract reasoning, which is naturally high, or very high, for a human being while a robot is totally lacking this capacity. This allows achievement of the objectives of the invention to prevent robots from browsing the site beyond the welcome page, while neither imposing to the people accessing it the burden of having to register and to log on, nor requiring the administrators of the site to manage a list of legitimate users.

To make the site even more resistant to browsing by a "smart" robot that could be tailored to adapt to a given challenge or set of predictable such challenges, prompting can be made random so that every time someone accesses the site, the challenge is different. For example, the cross can be moved to a different position on the image map so that the coordinates returned, when clicking on it, are different. Or, the prompting requst can change in requesting e.g., to click on triangle instead.

FIG. 2 shows the source HTML (Hyper Text Markup Language) code [140] for this example which uses a server side map i.e., ismap [142], included in an anchor tag created with the <a . . . > . . . </a> construct form [149] of the HTML language. Thus, when the user clicks on the cross [121], the browser sends a request back to the server URL (/cgi-bin/challenge.exe) [141] including the X and Y coordinates of the user's click contained in an ismap [142] so that the server can check whether the click coordinates indeed match the cross position. The anchor tag also carries an identification field i.e., id=XD34F739 [143] which is useful to correlate the answer, including the click coordinates, with the current challenge when this latter changes from one user to another as explained above.

Figure 3:
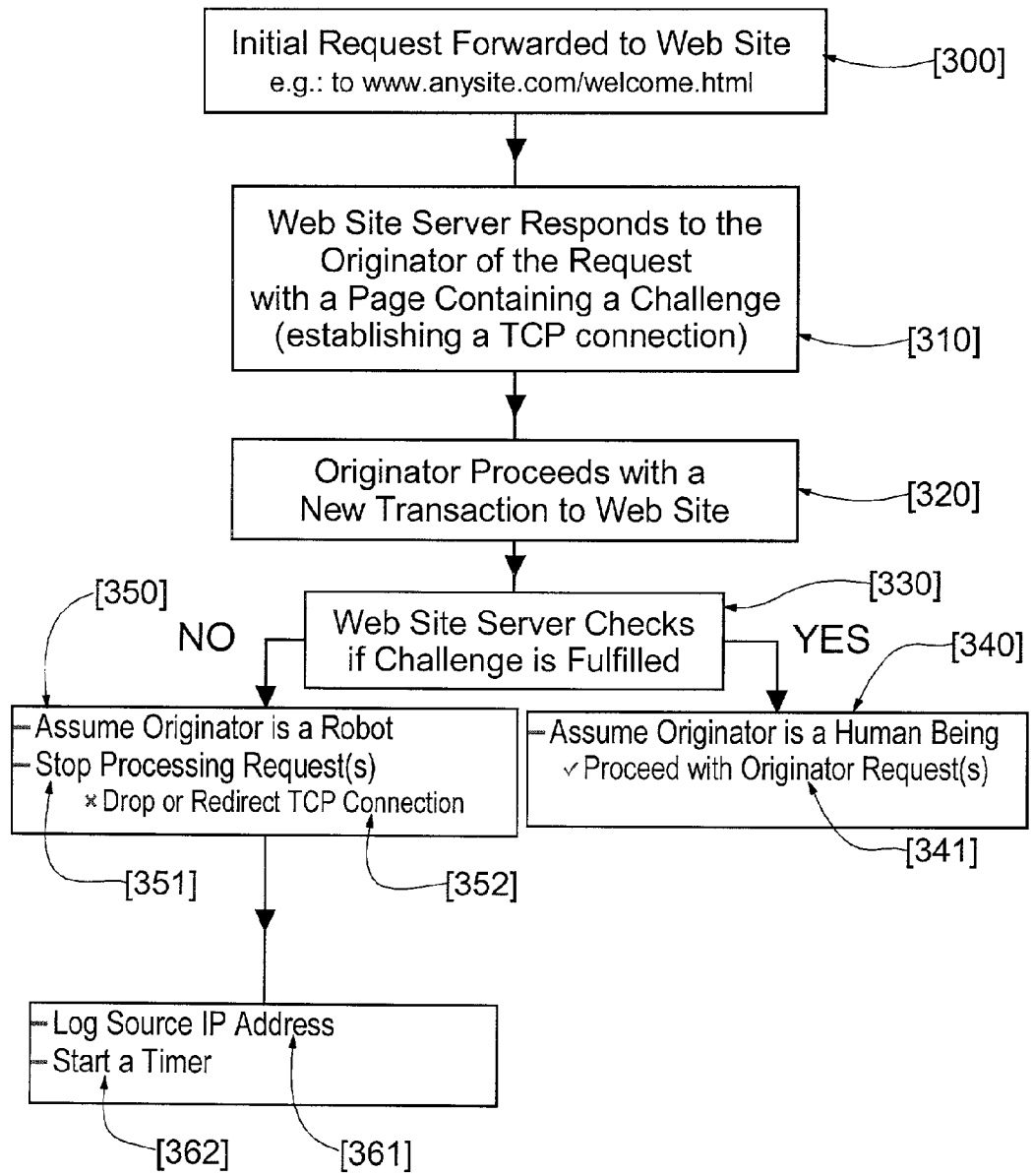
FIG. 3 shows the steps of the method of the invention.

FIG. 3 depicts the steps of the method according to the invention when an originator of an initial request to access a Web site is responded to with a challenge. Upon receiving this initial request, the [300] Web site server responds with the challenge [310]. This is done through the establishment of a TCP connection with the originator (the reliable transport protocol of the Internet TCP/IP suite of protocols used by the Web). The response is in the form of a Web page including a challenge e.g., of the kind discussed in FIG. 1. Then, having gotten the server's response, the originator proceeds with a new transaction containing his click response directed towards the Web site [320]. On receiving the new transaction, the Web site server checks whether the challenge is fulfilled or not [330]. If the response matches the challenge prompt [340], then the site server assumes that the originator is a human being and permits further access. However, if the Web server finds that challenge is not properly answered, it must assume that the originator is a robot [350]. As a consequence, it stops processing all current and further requests, if any [351], which includes dropping the TCP connection or redirecting it to another site [352]. Also, the IP source address [361] may be remembered and a timer started [362] so that access to the site may be temporarily barred, from that IP source address, as explained in FIG. 4.

Figure 4:
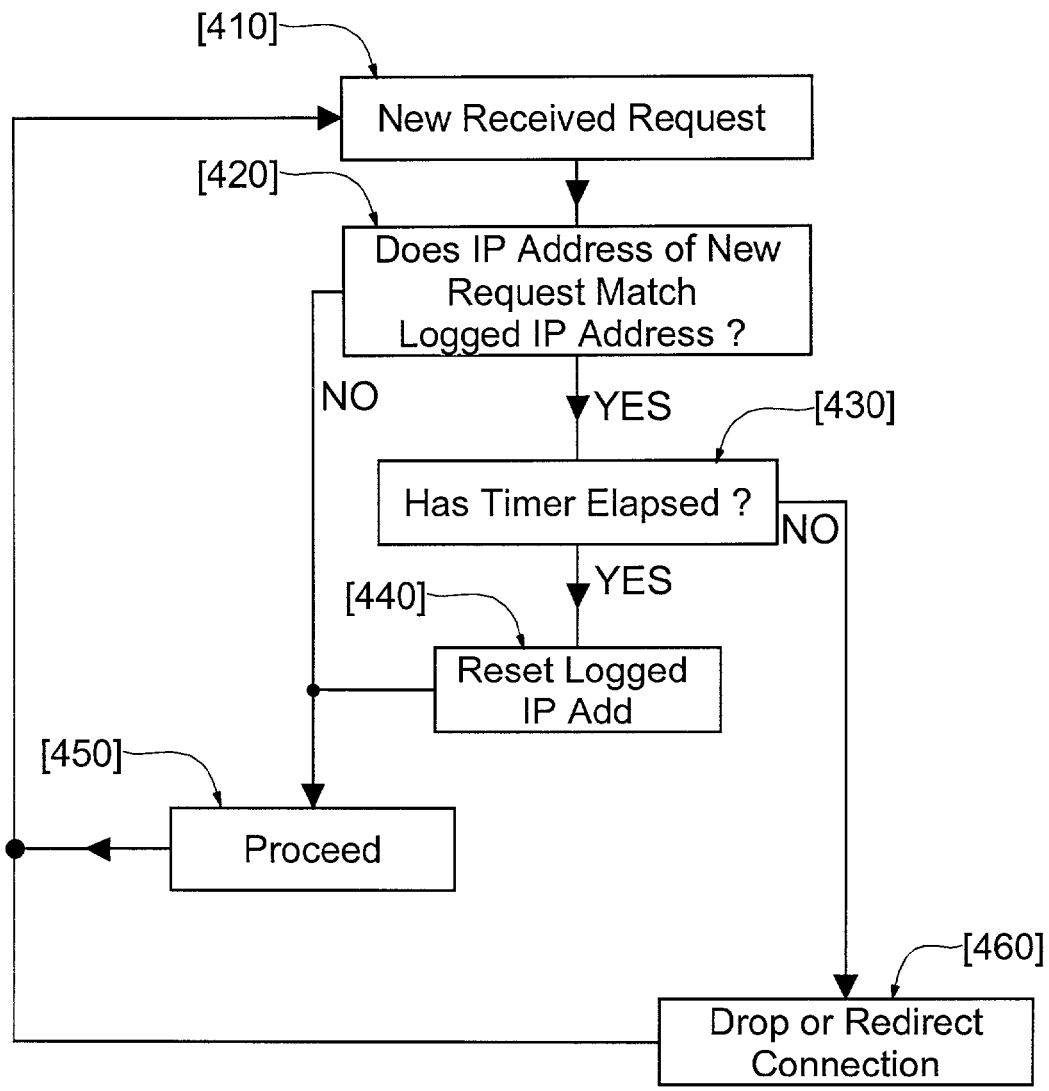
FIG. 4 shows the further steps of the method when access to a Web site per the invention is denied, while a timer is on, for requests carrying a logged IP address.

FIG. 4 shows the case where the IP address of an assumed robot originator is remembered. Then, the server may be implemented to temporarily drop or redirect immediately all requests issued with this particular source IP address, because all subsequent access requests thereafter are assumed to come from a robot (although this might not always be true since a robot may be behind a proxy or firewall performing a network address translation of all the IP source addresses it has to forward). Because the IP source address of the request was logged and a timer started as explained in FIG. 3, each time a new request is received [410] the server first checks for whether the same logged source IP address is found [420]. If not the same address, access may proceed normally [450]. If the address is the same, however, a timer is checked [430]. If the timer interval has elapsed, the logged IP address is reset [440] and new request is normally handled [450], i.e. a new challenge is issued. However, if timer has not elapsed, the TCP connection is dropped or redirected [460] before the server resumes handling of newly received requests [410].

FIG. 5 illustrates other exemplary challenge examples that are easily answered by human beings.

FIG. 5-a takes the form of a quiz [510] which could be made as simple as shown [500] or as sophisticated as necessary to defeat elaborated or "smart" robots or, alternatively, to adapt to a particular end-user population sharing a common type of skill.

FIG. 5-b is another alternative that combines images [520] and text [530] in an even more abstract way where the answer is suggested by the text, so it is even better adapted to discriminate a human being from a robot. However, it is worth mentioning here that such a challenge is culture-dependent and could serve as well to discriminate human beings on the basis of their social or ethnic origins.

What is claimed is:

1. A method for preventing robots from browsing a Web site beyond a welcome page, comprising:
    receiving an initial request, directed to the Web site, from an undefined originator;
    responding to the initial request with a challenge that prompts a response to the challenge from the undefined originator; and
    receiving the response to the challenge from the undefined originator, wherein the challenge includes:
- a plurality of graphical forms, and
- an accompanying textual expression describing one of the plurality of graphical forms, and
- the response to the challenge includes an identification of a location of the described one of the plurality of graphical forms.

2. The method of claim 1, further comprising modifying the challenge in response to a second initial request.

3. The method of claim 2, wherein the modifying includes varying a coordinate location of the described one of the plurality of graphical forms.

4. The method of claim 2, wherein the modifying includes varying which one of the plurality of graphical forms is described by the accompanying textual expression.

5. The method of claim 1, further comprising processing further requests from the undefined originator after the challenge has been successfully fulfilled.

6. The method of claim 1, further comprising stopping processing of further requests from the undefined originator after the challenge has not been successfully fulfilled.

7. The method of claim 6, wherein the stopping processing includes dropping or redirecting a TCP connection established with the undefined originator.

8. The method of claim 1, further comprising logging a source IP address of the undefined originator, and starting a timer.

9. The method of claim 1, further comprising:
- receiving a new request;
- determining whether a source IP address of the new request matches the logged source IP address of the undefined originator;
- determining whether said timer is expired; and
- upon the source IP address of the new request matching the logged source IP address of the undefined originator and the timer being expired, responding to the new request with a second challenge that prompts a response to the second challenge.

10. The method of claim 1, wherein the location is X and Y coordinates of the undefined originator's click associated with the challenge.

11. A computer program product comprising a non-transitory computer usable storage medium having stored therein computer usable program code for preventing robots from browsing a Web site beyond a welcome page, the computer usable program code, which when executed by a computer hardware device, causes the computer hardware device to perform:
- receiving an initial request, directed to the Web site, from an undefined originator;
- responding to the initial request with a challenge that prompts a response to the challenge from the undefined originator; and
- receiving the response to the challenge from the undefined originator, wherein
- the challenge includes:
- a plurality of graphical forms, and
- an accompanying textual expression describing one of the plurality of graphical forms, and
- the response to the challenge includes an identification of a location of the described one of the plurality of graphical forms.

12. The computer program product of claim 11, wherein the computer hardware device is further caused to perform modifying the challenge in response to a second initial request.

13. The computer program product of claim 12, wherein the modifying includes varying a coordinate location of the described one of the plurality of graphical forms.

14. The computer program product of claim 12, wherein the modifying includes varying which one of the plurality of graphical forms is described by the accompanying textual expression.

15. The computer program product of claim 11, wherein the computer hardware device is further caused to perform processing further requests from the undefined originator after the challenge has been successfully fulfilled.

16. The computer program product of claim 11, wherein the computer hardware device is further caused to perform stopping processing of further requests from the undefined originator after the challenge has not been successfully fulfilled.

17. The computer program product of claim 16, wherein the stopping processing includes dropping or redirecting a TCP connection established with the undefined originator.

18. The computer program product of claim 11, wherein the computer hardware device is further caused to perform logging a source IP address of the undefined originator, and starting a timer.

19. The computer program product of claim 11, wherein the computer hardware device is further caused to perform:
- receiving a new request;
- determining whether a source IP address of the new request matches the logged source IP address of the undefined originator;
- determining whether said timer is expired; and
- upon the source IP address of the new request matching the logged source IP address of the undefined originator and the timer being expired, responding to the new request with a second challenge that prompts a response to the second challenge.

20. The computer program product of claim 11, wherein the location is X and Y coordinates of the undefined originator's click associated with the challenge.

\* \* \* \* \*